US006502803B1

(12) United States Patent
Mattes

(10) Patent No.: US 6,502,803 B1
(45) Date of Patent: Jan. 7, 2003

(54) VALVE FOR CONTROLLING LIQUIDS

(75) Inventor: Patrick Mattes, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,837

(22) PCT Filed: Sep. 14, 2000

(86) PCT No.: PCT/DE00/03200

§ 371 (c)(1), (2), (4) Date: May 25, 2001

(87) PCT Pub. No.: WO01/23744

PCT Pub. Date: May 4, 2001

(30) Foreign Application Priority Data

Sep. 30, 1999 (DE) ........................................ 199 46 840

(51) Int. Cl.[7] ................................................ F16K 31/02

(52) U.S. Cl. ............................ 251/129.06; 251/129.07; 251/282; 137/906; 239/102.2; 239/533.7; 123/458

(58) Field of Search ....................... 251/129.06, 129.07, 251/281, 282, 337, 335.2, 129.17; 137/906; 239/102.1, 102.2, 584, 533.2, 533.7; 123/458, 472, 498

(56) References Cited

U.S. PATENT DOCUMENTS 4,529,164 A * 7/1985 Igashira et al. ............. 123/472
4,584,980 A * 4/1986 Weiger et al. .............. 123/458
4,725,002 A * 2/1988 Trachte ................... 239/102.2
4,907,748 A * 3/1990 Gardner et al. ............. 239/584
5,092,360 A * 3/1992 Watanabe et al. ......... 137/487.5
5,779,149 A * 7/1998 Hayes, Jr. ................... 239/124
6,085,990 A * 7/2000 Augustin ................. 239/397.5
6,148,842 A * 11/2000 Kappel et al. ............. 137/78.1

FOREIGN PATENT DOCUMENTS

DE 32 37 258 C 12/1983
DE 37 13 697 A 11/1988
DE 197 27 992 A 1/1999
EP 0 477 400 A 4/1992
EP 0 816 670 A 1/1998

* cited by examiner

*Primary Examiner*—Henry C. Yuen
*Assistant Examiner*—Patrick Buechner
(74) *Attorney, Agent, or Firm*—Michael J. Striker

(57) ABSTRACT

A valve for controlling fluids is embodied with a piezoelectric actuator (3) for actuating a valve member (2) that on one end has a valve head (7), forming a valve closing member, that cooperates with a seat (8) provided on the valve body (6) for opening and closing the valve (1). On a side of the piezoelectric actuator (3) remote from the valve member (2), a hydraulic chamber (21) is provided, which communicates, via at least one hydraulic line (23), with a bore (5) of the valve member (2) that is sealed from the piezoelectric actuator (3), and into which bore a piston (20) connected to the piezoelectric actuator (3) can plunge; the hydraulic chamber (21) is embodied as a hydraulic spring, which with its spring force on the piston (20) connected to the piezoelectric actuator (3) act as the prestressing element and the tolerance compensating element. The valve is intended in particular as a component of a fuel injection valve.

10 Claims, 1 Drawing Sheet

VALVE FOR CONTROLLING LIQUIDS

PRIOR ART

Figure 1:
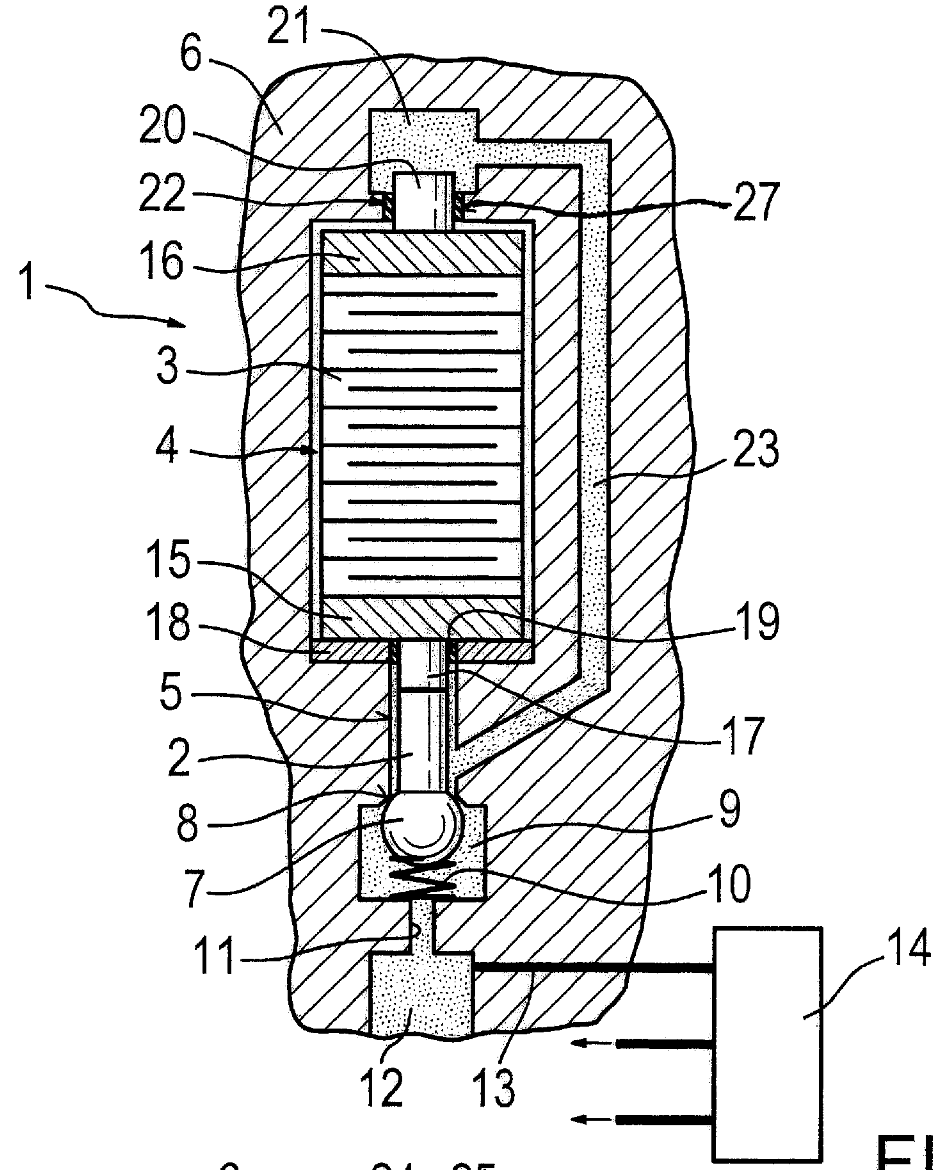

The invention relates to a valve for controlling fluids. From European Patent Disclosure EP 0 477 400 A1, a valve is already known which is actuatable via a piezoelectric actuator. This known valve has an arrangement for an adaptive mechanical tolerance compensation, effective in the stroke direction, for a travel transformer of the piezelectric actuator, in which the deflection of the piezoelectric actuator is transmitted via a hydraulic chamber.

The hydraulic chamber, which functions as a so-called hydraulic step-up means, encloses a common compensation volume between two pistons defining this chamber, of which one piston is embodied with a smaller diameter and is connected to a valve member to be triggered, and the other piston is embodied with a larger diameter and is connected to the piezoelectric actuator. The hydraulic chamber is fastened between the two pistons in such a way that the actuating piston of the valve member, which piston is retained in its position of repose by means of one or more springs relative to a predetermined position, executes a stroke that is increased by the step-up ratio of the piston diameter when the larger piston is moved a certain travel distance by the piezoelectric actuator. The valve member, piston and piezoelectric actuator are located one after the other on a common axis.

Via the compensation volume of the hydraulic chamber, tolerances caused by temperature gradients in the component or different coefficients of thermal expansion of the materials used and possible settling effects can be compensated for without causing a change in position of the valve member to be triggered.

Compensating for changes in length of the piezoelectric actuator, the valve member or the valve housing by means of the hydraulic chamber disposed between two pistons requires a complicated construction, however, and is problematic in terms of the incident leakage losses and the refilling of the hydraulic chamber.

Furthermore, it is well known for a piezoelectric actuator to be constructed of a plurality of thin layers, in order to attain the longest possible stroke. So that these layers will not separate from one another when current is supplied to the piezoelectric actuator, the piezoelectric actuator must be prestressed, and the force to be brought to bear can amount to approximately 1000 N.

In practice, for prestressing the piezoelectric actuator, either cup springs or flat spiral springs are used. A disadvantage of this is that the springs required for the prestressing dictate a complicated design and require a large amount of space, and the latter leads to a correspondingly large diameter of the entire valve, thus limiting the options for installing the valve. Using springs as prestressing elements also has the disadvantage that over the duration of their use, they cause friction rust.

The object of the invention is to create a valve for controlling fluids in which the prestressing of a piezoelectric actuator and tolerance compensation are achieved while requiring little installation space, with a simple structure having as few components as possible.

Advantages of the Invention

The valve for controlling fluids according to the invention has the advantage that with the hydraulic chamber embodied as a hydraulic spring, a prestressing element for the piezoelectric actuator and a compensation element, in particular for temperature-dictated elongation tolerances, are simultaneously achieved.

In the hydraulic prestressing element according to the invention with integrated tolerance compensation for the piezoelectric actuator, the prestressing is achieved hydraulically and with little demand for space; by the omission of springs or other mechanical prestressing elements, a desirable slender shape of the entire valve is possible.

Because of the reduction in the number of components required to act as both a prestressing element and a tolerance compensating element, which according to the invention is integrated with the prestressing element, the production costs and effort of assembly can be reduced markedly.

A significant advantage of the invention is furthermore that by dimensioning of the hydraulic chamber, the hydraulic spring, and the piston that plunges into the spring and the chamber, the overall rigidity of the system can be enhanced. Since the rigidity of the hydraulic spring is dependent on the cross-sectional area of the piston, for the same pressure the rigidity of the hydraulic spring and thus the prestressing force on the piezoelectric actuator can be increased, if the cross-sectional area of the piston plunging into the hydraulic chamber is enlarged accordingly. In the static case, even at a high spring rate, a disadvantageous change in length of the entire device can be averted, if the piezoelectric actuator, valve member or valve body changes its length, for instance on heating up. In addition, upon a dynamic actuation, the rigidity of the hydraulic spring on which the piston is braced becomes greater, the greater the selected diameter of the piston. This has the further advantage that the stroke losses of the piston decrease as the diameter increases.

Further advantages and advantageous features of the subject of the invention can be learned from the is specification, drawing and claims.

DRAWING

Two exemplary embodiments of the valve of the invention for controlling fluids are shown in the drawing and described in further detail in the ensuing description. Shown are FIG. 1, a schematic, fragmentary view of a first exemplary embodiment of the invention in a fuel injection valve for internal combustion engines, in longitudinal section; and FIG. 2, a schematic view of a second, fragmentary exemplary embodiment, in a fuel injection valve in longitudinal section.

DESCRIPTION OF THE EXEMPLARY EMBODIMENTS

The first exemplary embodiment shown in FIG. 1 illustrates a use of the valve of the invention in a fuel injection valve 1 for internal combustion engines of motor vehicles. The fuel injection valve 1 is embodied here as a common rail injector, and the fuel injection is controlled via the pressure level in a valve control chamber 12, which is connected to a high-pressure supply.

For setting an injection onset, injection duration, and injection quantity via force ratios in the fuel injection valve 1, a valve member 2 is triggered via a piezoelectric actuator 3, which is disposed on the side of the valve member 2, remote from the combustion chamber, in a piezoelectric chamber 4.

The pistonlike valve member 2 is disposed axially displaceably in a bore 5, embodied as a longitudinal bore, of a valve body 6, and on its end toward the combustion chamber it has a ball-shaped valve head 7 forming a valve closing member. The valve head 7 cooperates with a seat 8, embodied on the valve body 6, and in the raised state of the valve head 7, a communication is established with a spring chamber 9 that has a spring 10 that exerts a restoring force on the outward-opening valve head 7. The spring chamber 9 is adjoined toward the combustion chamber by an outlet throttle 11, which leads to a valve control chamber 12, into which an injection line 13, represented only symbolically in FIG. 1, discharges; this line in turn leads away from a high-pressure chamber (common rail) 14 that is common to all the fuel injection valves. The common rail 14 is filled with fuel at high pressure from a tank in a known way by a high-pressure fuel feed pump.

The piezoelectric actuator 3 is constructed of multiple layers and on its side toward the combustion chamber it has an actuator head 15 and on its side remote from the combustion chamber it has an actuator foot 16. A control piston 17 is secured to the actuator head 15 and from the piezoelectric chamber 4 extends, by means of a support 18 for the actuator head 15 on the wall toward the combustion chamber of the piezoelectric chamber 4, into the longitudinal bore 5 in which the valve member 2 is supported. In the region of the control piston 17, the piezoelectric chamber 4 is sealed off from the longitudinal bore 5 with a sealing device 19. The actuator foot 16 is solidly connected to a further piston 20, which plunges into a hydraulic chamber 21 that is disposed on the side of the piezoelectric actuator 3 remote from the valve member 2, above the piezoelectric chamber 4, in the installed position of the fuel Injection valve 1. The piezoelectric chamber 4 is sealed from the hydraulic chamber 21, in the region of the piston 20 guided into the hydraulic chamber 21, via a further sealing device 22.

The essentially closed hydraulic chamber 21, with the pressure medium contained in it, which is supplied from a low-pressure source at a pressure that is depressurized compared to the pressure level of the common rail 14, as a hydraulic spring, which communicates via a hydraulic line 23, embodied in the valve body 6, with the longitudinal bore 5 included in the valve member 2. The hydraulic spring performs a dual function; first, it acts as a prestressing element for the piezoelectric actuator 3, and second, it is a tolerance compensating element.

The fuel injection valve 1 of the drawing functions as follows.

In the closed state of the fuel injection valve 1, that is, when there is no current to the piezoelectric actuator 3, the valve head 7 of the valve member 2 is kept in contact with the seat 8 assigned to it, so that no fuel from the valve control chamber 12, communicating with the common rail 14, can reach the region of the longitudinal bore 5. Because of a slightly raised system pressure in the hydraulic chamber 21 of approximately 65 bar in the present version, the piezoelectric actuator 3 is fastened between the hydraulic spring and the support 18 toward the combustion chamber.

Since with increasing diameter of the piston 20 protruding into the hydraulic chamber 21, the spring rate of the hydraulic spring increases proportionately, the prestressing force of the piezoelectric actuator 3 can be adjusted via the diameter of the piston 20; the greatest possible piston diameter is advantageous. In the present exemplary embodiment, a piston diameter of 14 mm suffices to achieve a prestressing force of 1000 N, for a system pressure of 65 bar. It is understood that values adapted to an individual case and differing from these can be selected by one skilled in the art.

In the event of a slow actuation, as occurs upon a temperature-dictated change in length of the piezoelectric actuator 3 or other valve components, such as the valve member 2 or the valve housing or valve body 6, the piston 20 penetrates the compensation volume of the hydraulic chamber 21 upon an increase in temperature, or retracts from it upon a temperature drop, without any overall effects on the closing and opening position of the valve member 2 and of the fuel valve 1.

If an injection through the fuel injection valve 1 is to take place, the piezoelectric actuator 3 is supplied with current, which causes it to increase its axial length abruptly. Upon this kind of fast actuation of the piezoelectric actuator 3, the piezoelectric actuator is braced on the support 18 and with the piston 20, protruding into the hydraulic chamber 21, on the hydraulic spring, and as a consequence hydraulic medium is displaced out of the hydraulic chamber 21 via the hydraulic line 23 into the longitudinal bore 5 of the valve member 2, and as a result the valve head 7 of the valve member 2 is lifted from its seat 8 into an open position. Once again, the increased rigidity has a favorable effect because of a relatively large selected diameter of the piston 20.

Figure 2:
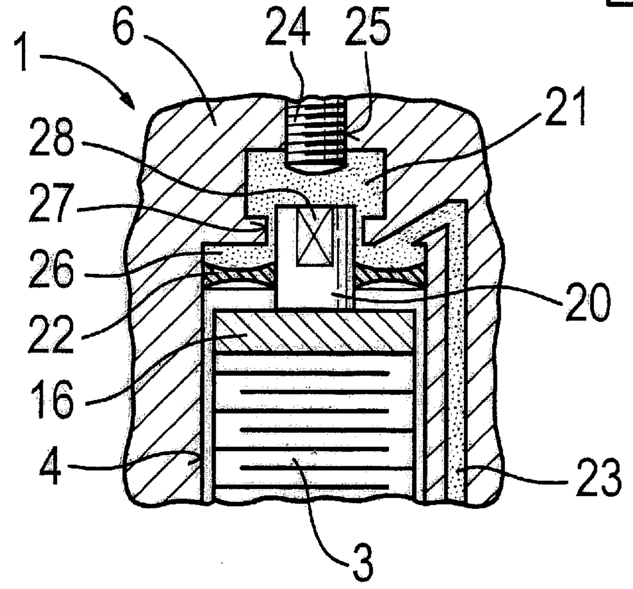

In FIG. 2, a second exemplary embodiment of the fuel injection valve 1 is shown, in which for the sake of simplicity functionally identical components are identified by the same reference numerals as in FIG. 1. Compared to the version of FIG. 1, the fuel injection valve 1 shown here differs in that the volume of the hydraulic chamber 21 that cooperates with the piezoelectric actuator 3 can be varied from outside.

To that end, as a calibration device 24 in the present exemplary embodiment, a schematically illustrated adjusting screw is provided in a bore 25; it is positioned such that the adjusting screw 24 can be screwed as needed to protrude into the hydraulic chamber 21, and as a result the compensation volume is reduced or increased, depending on the change in position of the adjusting screw 24. With this provision, it is possible to a limited extent to compensate for tolerances in quantity, since the rigidity of the compensation volume is inversely proportional to the volume. Depending on the rigidity of the hydraulic spring in the hydraulic chamber 21, the opening behavior of the fuel injection valve 1 and thus the injection quantity can be varied. Thus the adjusting screw 24 makes external readjustment of the injection quantity possible, by correction of the compensation volume in the hydraulic chamber 21.

Also in the version of FIG. 2, the sealing device 22 for separating the hydraulic chamber 21 from the piezoelectric chamber 4 is disposed in a region of the piston 20, protruding into the hydraulic chamber 21, that is located inside the piezoelectric chamber 4, so that an annular chamber 26 having the same diameter as the piezoelectric chamber 4 is separated from the piezoelectric chamber. As in the version of FIG. 1, the sealing device 22 has the function here as well of protecting the piezoelectric actuator 4 against a possible water component contained in the hydraulic medium and against harmful particles, such as chips.

The hydraulic line 23 here discharges into the annular chamber 26, which communicates with the hydraulic chamber 21 via an annular gap 27. To improve the filling performance, a filling face 28 is recessed out of the piston 20 in the region of the annular gap 27.

In both versions described, the hydraulic medium for filling the hydraulic chamber 21 is the fuel that is also injected into a combustion chamber of an internal combustion engine.

Upon a suitable separation between fuel delivery and the removal of the hydraulic medium emerging from the seat 8 of the valve head 7, and replenishment of leakage losses, it is also possible to use separate oil, such as motor oil, as the hydraulic medium.

What is claimed is:

1. A valve for controlling fluids, comprising: a valve member (2), which is axially displaceable in a bore (5) of a valve body (6) and on its end has a valve head (7) forming a valve closing member, which cooperates with a seat (8), provided on the valve body (6), for opening and closing the valve (1), and having a piezoelectric actuator (3) for actuating the valve member (2), and a hydraulic chamber (21) disposed on a side of the piezoelectric actuator (3) remote from the valve member (2), wherein said hydraulic chamber (21) communicates with the bore (5) of the valve member (2) via at least one hydraulic line (23), the bore being sealed off from the piezoelectric actuator (3), and wherein a piston (20) connected to the piezoelectric actuator (3) plunges Into said hydraulic chamber (21), the hydraulic chamber (21) comprising a hydraulic spring, wherein a spring force of said hydraulic spring acting on the piston (20) connected to the piezoelectric actuator (3) acts as a prestressing element for the piezoelectric actuator (3) and a tolerance compensating element for compensating for elongation tolerances of the piezoelectric actuator (3) and/or other valve components (2, 6).

2. The valve of claim 1, wherein the piezoelectric actuator (3) extends, with a control piston (17), secured to an actuator head (15), into the bore (5) that is sealed off from the piezoelectric actuator (3) and receives the valve member (2).

3. The valve of claim 1, wherein the volume of the hydraulic chamber (21) is variable by means of an externally operable calibration device (24).

4. The valve of claim 3, wherein the calibration device is an adjusting screw (24), which can be screwed so as to plunge into the hydraulic medium of the hydraulic chamber (21).

5. The valve of claim 1, wherein said valve is a component of a common rail injector (1) of an internal combustion engine.

6. The valve of claim 5, wherein the hydraulic medium for filling the hydraulic chamber (21) is fuel.

7. The valve of claim 1, wherein the piezoelectric actuator (3) is braced between the hydraulic spring, which is formed in the hydraulic chamber (21) by means of a hydraulic medium from a low-pressure source, and a support (18) on a side, remote from the hydraulic chamber (21), of a piezoelectric chamber (4) that receives the piezoelectric actuator (3).

8. The valve of claim 7, wherein the hydraulic chamber (21) is sealed off from the piezoelectric actuator (3) in the region of the piston (20) by means of a sealing device (22), which is disposed in an annular gap (27) between the hydraulic chamber (21) and the piezoelectric chamber (4).

9. The valve of claim 7, wherein the hydraulic chamber (21) is sealed off from the piezoelectric actuator (3) by means of a sealing device (22), which is disposed in the region of the piezoelectric chamber (4) and separates an annular chamber (26), having the diameter of the piezoelectric chamber (4), from the piezoelectric chamber, and the hydraulic line (23) discharges into the annular chamber (26) that communicates with the hydraulic chamber (21) via an annular gap (27).

10. The valve of claim 9, wherein a filling face (28) is formed on the piston (20) in the region of the annular gap (27).

* * * * *